July 29, 1947.   F. E. SWAIN   2,424,863
FLEXIBLE PIPE
Filed Dec. 27, 1944

Inventor
Frank E. Swain
by Mawhinney & Mawhinney
Attorneys

Patented July 29, 1947

2,424,863

UNITED STATES PATENT OFFICE 2,424,863

FLEXIBLE PIPE

Frank Edward Swain, Ewell, England, assignor of one-half to Douglas Darby, Northwood, Middlesex, England Application December 27, 1944, Serial No. 569,947
In Great Britain October 18, 1944

5 Claims. (Cl. 138—60)

This invention relates to a flexible pipe, my main object being to provide an improved flexible pipe which will be capable of carrying hydraulic fluid at very high pressures.

According to the invention, a flexible pipe comprises a flexible tube, a stack of radially-rigid, correspondingly-dished washers mounted thereon in contact with one another and with the tube, and end pieces secured to the tube ends and serving for the axial location of the washers.

In a modification the washers are integrally united with one another to be in the form of a helical spring the convolutions of which abut one another and are radially rigid and correspondingly dished in cross-section.

As an alternative the flexible tube may be confined by such washers along a portion of its length and by such a spring along another portion.

The flexible tube may be one having considerable flexibility, e. g., formed of rubber (and the term rubber is used herein to include artificial or natural rubber and products incorporating the same) which is preferably reinforced; or it may be a tube having a low degree of flexiblity, for example, a soft copper tube, a lead tube, or a tube formed of flexible artificial glass.

In a preferred arrangement the washers or the convolutions, as the case may be, have surfaces which are part-spherical about centres which are coaxial with the tube when this is not bent.

In the case of a flexible tube having a high degree of flexibility, the tube is preferably placed under tension while the washers or spring convolutions, as the case may be, are being mounted thereon and the locking end piece secured in position.

Figure 1:
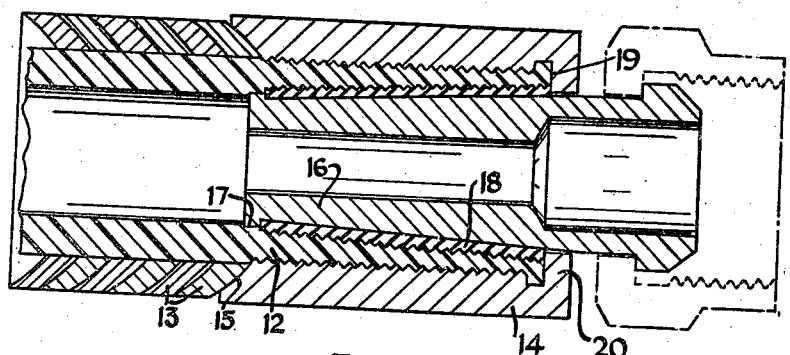
Figure 1 is a sectional elevation of one end of a flexible pipe according to the invention, the method of securing the end piece thereto being covered by the specification of co-pending British patent application No. 18981/44.

In the construction of Figure 1, the flexible tube 12 is of rubber, and surrounding it is a stack of correspondingly-dished, radially-rigid washers 13 of aluminium or an alloy thereof, or of a plastic, and they have surfaces which are part-spherical about centres which lie on the axis of the tube 12 when the tube is straight. The end piece in this instance includes a rigid external sleeve 14 having a part-spherical concave face 15 with which the adjacent washer 13 coacts, whilst the corresponding end sleeve (not shown) at the other end of the tube will, of course, have a corresponding convex part-spherical face.

The sleeve 14 has an internal screw-thread, and it is screwed upon the end of the flexible tube, after which the taper portion 16 of a hollow adaptor is driven in until a shallow collar 17 at the inner, smaller end springs over a previously-inserted, radially-expansible fibre or other internal sleeve 18 which has a sufficient axial rigidity to interlock against the inner radial face 19 of the flange 20, fast with the outer sleeve, when expanded to compress the material of the end of the flexible tube under the action of driving in the taper portion. The internal sleeve 18 is shown as having an external screw-thread to facilitate its insertion and to provide a keying effect with the bore of the flexible tube.

In the modification of Figure 2, where 12 again represents the flexible tube, 13 the correspondingly-dished washers, 14 an internally-threaded external sleeve having a flange 20, 16 the taper portion of a hollow adaptor, and 18 a radially-expansible internal sleeve, the adaptor is provided with a peripheral groove 23 adjacent the larger end of the taper portion 16, and coacting with this groove is a circlip 24 adapted to interlock with the inner radial face 19 of the flange 20. It will be understood that the circlip may be an inwardly-springing one, in which case it will be mounted in the bore of the extremity of the flexible tube in the first instance before the taper portion 16 is driven into position, or it may be an outwardly-springing circlip, in which case it is initially mounted in the peripheral groove 23, springing outwardly as necessary during the insertion of the adaptor after it has passed the flange 20. The internal sleeve 18, which is not essential in this construction, facilitates the entry of the taper portion 16.

Figure 3:
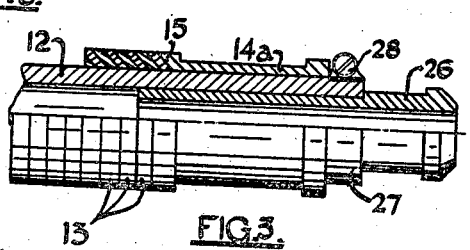
Figure 3 is a part-sectional elevation of an alternative end piece for a flexible pipe according to the invention.

The same reference numerals are also applied to Figure 3 to denote similar parts. In Figure 3, however, the inserted portion of the hollow adaptor 26 is of cylindrical and not of tapering section, and the external sleeve 14a is not provided with an end flange 26. In this example location of the parts is effected by means of a flexible strap 27 having out-turned ends engaged by a tangential bolt 28, in a manner known per se.

Figure 2:
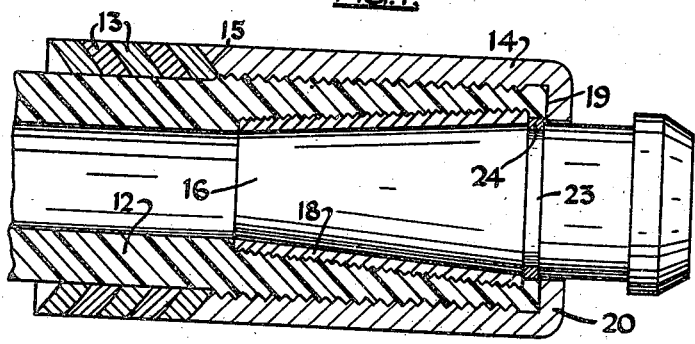
Figure 2 is a sectional elevation of the end of a flexible pipe, according to the invention, having an end piece arranged as disclosed in the specification of co-pending British patent application No. 20584/44, the adaptor being in elevation.

In all the constructions of Figures 1, 2 and 3, the flexible tube 12 should be placed under tension, during assembly, after the washers 13 have been threaded thereon and whilst the last of the end pieces is being secured to the adjacent end of the flexible tube, and in this way the washers are adequately located in an axial direction when the tension is released. The tension to which the flexible tube would be subjected in practice will never exceed a function of the bore area multiplied by the internal fluid load, as long as the washers are of sufficient strength to carry the load without fracture or radial distortion.

It is interesting to consider that a pipe of this kind when being flexed does not alter as regards its internal capacity.

In the case of a relatively-rigid pipe which is adapted to work when bent and which is subjected to vibration, the friction of the relative movements between adjacent washers under the vibration tends to damp out the vibration.

Figure 5:
Figure 5 is a cross-section through a few convolutions of a helical spring which may replace the washers of Figures 1, 2 or 3.
Figure 4:
Figure 4 is a cross-section through one of the dished washers.

In the examples, illustrated by Figures 1, 2 and 3 the flexible tube 12 is, as stated, enclosed and confined by radially-rigid, part-spherical washers. As an alternative therefor these washers 13a may be replaced by a helical spring adjacent convolutions of which abut one another and are radially rigid and correspondingly dished, as shown by the fragmentary view of Figure 5.

What I claim as my invention and desire to secure by Letters Patent of the United States is:

1. A flexible pipe comprising a flexible tube, a stack of radially-rigid, corresponding, spherically-dished members mounted thereon in contact with one another and with said tube, the sphere centres being on the median line of the tube so that said members can slide one on another transversely of the tube when the latter has flexed, and end pieces secured to the tube ends so as to maintain said members in full contact with one another.

2. A flexible pipe comprising a flexible tube, a stack of similar radially-rigid washers the surfaces of which are part-spherical and which are mounted thereon in contact with one another and with said tube, the sphere centres being on the median line of the tube so that said washers can slide one on the other transversely of the tube when the latter is flexed, and end pieces secured to the tube ends and serving to maintain said washers in full contact with one another and said tube under tension.

3. A flexible pipe, according to claim 1, of which the flexible tube has a high degree of flexibility and is placed under tension while said members are being mounted thereon and the end pieces secured in position.

4. A flexible pipe comprising a flexible tube, a radially-rigid helix having its convolutions correspondingly arcuate in cross-section about the median line of the tube and in contact with one another and with said tube, and end pieces secured to the tube ends and serving for maintaining said convolutions in contact with one another such that said convolutions can slide in full contact one on the other transversely of the tube when the latter is flexed.

5. A flexible pipe comprising a flexible tube, a radially-rigid helix encircling the tube in contact therewith, and end pieces secured to the tube ends and acting on the ends of the helix to maintain the convolutions thereof in full contact with one another, the convolutions being correspondingly arcuate in cross-section about the median line of the tube when not flexed, the sectional thickness of a convolution in an axial direction being less than the overall sectional width in a radial direction.

FRANK EDWARD SWAIN.

REFERENCES CITED

The following references are of record in the file of this patent:

UNITED STATES PATENTS

| Number | Name | Date |
| --- | --- | --- |
| 840,536 | Weir | Jan. 8, 1907 |
| 409,120 | Soule | Aug. 13, 1889 |
| 1,015,311 | Gold | Jan. 23, 1912 |
| 912,308 | Grimler | Feb. 16, 1909 |